United States Patent
Imig

[19]

[11] Patent Number: 5,840,128
[45] Date of Patent: Nov. 24, 1998

[54] WATER SERVICE LINE CLEANING DEVICE AND METHOD

[76] Inventor: Michael A. Imig, 531 Country La., Beecher, Ill. 60401-0263

[21] Appl. No.: 667,958

[22] Filed: Jun. 19, 1996

[51] Int. Cl.[6] .............................. B08B 9/03; B08B 9/00; B08B 1/00; F16L 45/00
[52] U.S. Cl. ..................... 134/8; 434/22.11; 434/22.12; 15/104.03; 15/104.05; 15/104.37; 15/104.32; 15/104.33; 15/104.16
[58] Field of Search ........................... 15/104.05, 104.03, 15/104.33, 104.31, 104.32, 104.16; 134/8, 22.11, 22.12

[56] References Cited

U.S. PATENT DOCUMENTS

| | | | |
|---|---|---|---|
| 405,105 | 6/1889 | Crance | 15/104.03 |
| 1,238,269 | 8/1917 | Cornwell | 15/104.03 |
| 5,107,550 | 4/1992 | Hawro | 15/105.33 |

Primary Examiner—W. Gary Jones
Assistant Examiner—Joyce Tung
Attorney, Agent, or Firm—Potthast & Ring

[57] ABSTRACT

An apparatus for removing an obstruction within a pressurized fluid service pipeline which includes a flexible rod; a module for connecting to the service pipeline in which the module defines a channel and a first opening in which the first opening communicates with and between the service pipeline and the channel and permits the channel to receive the pressurized fluid from the pipeline in which the module defines a second opening which communicates with and between the channel and an outside of the module; and a flexible seal in which the seal defines an opening and in which the seal is positioned to abut the module and align the opening of the seal with the second opening for receiving the insertion of the flexible rod through the opening of the seal to engage the obstruction in the pipeline, in which at least a portion of the flexible seal engages the flexible rod inhibiting the pressurized fluid in the channel from moving along the flexible rod to the outside of the module, and in which at least a portion of the flexible seal is flexed against the flexible rod further inhibiting the pressurized fluid from passing from the channel along the flexible rod to the outside of the module. A method is also employed to remove obstructions within a pressurized fluid service pipeline.

34 Claims, 4 Drawing Sheets

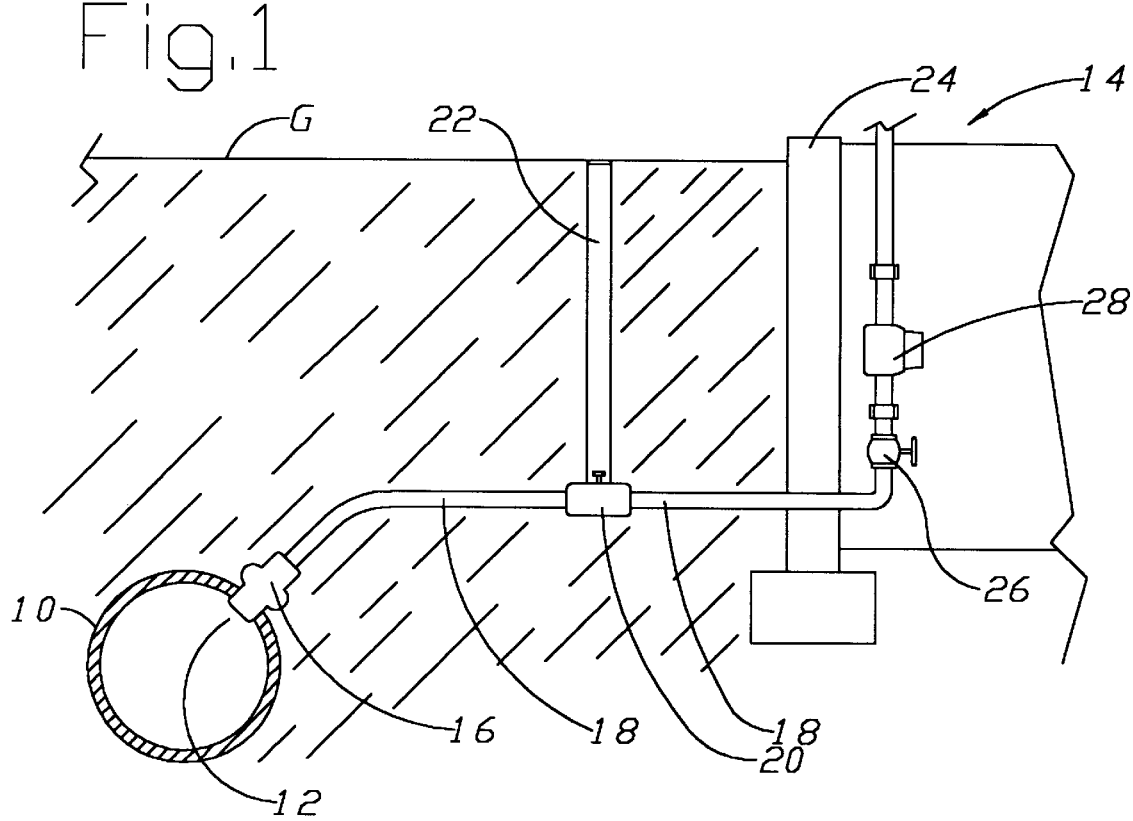
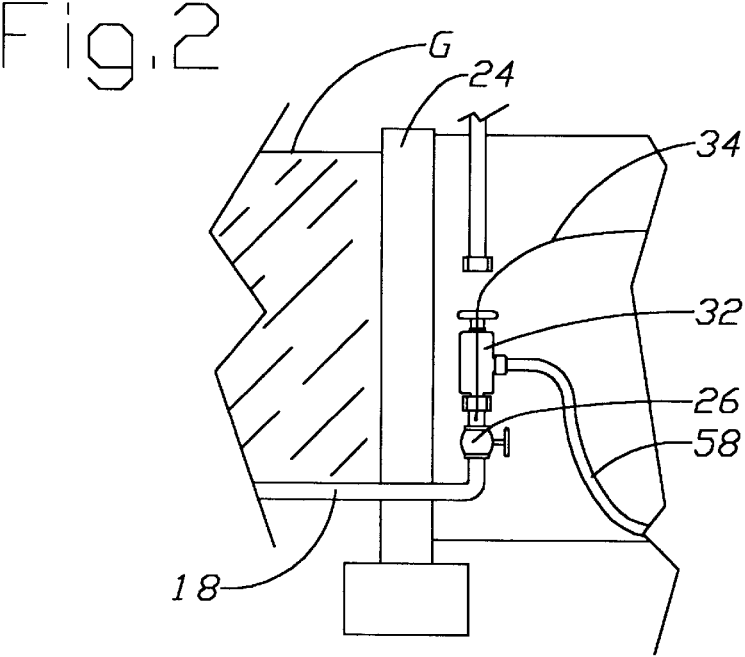

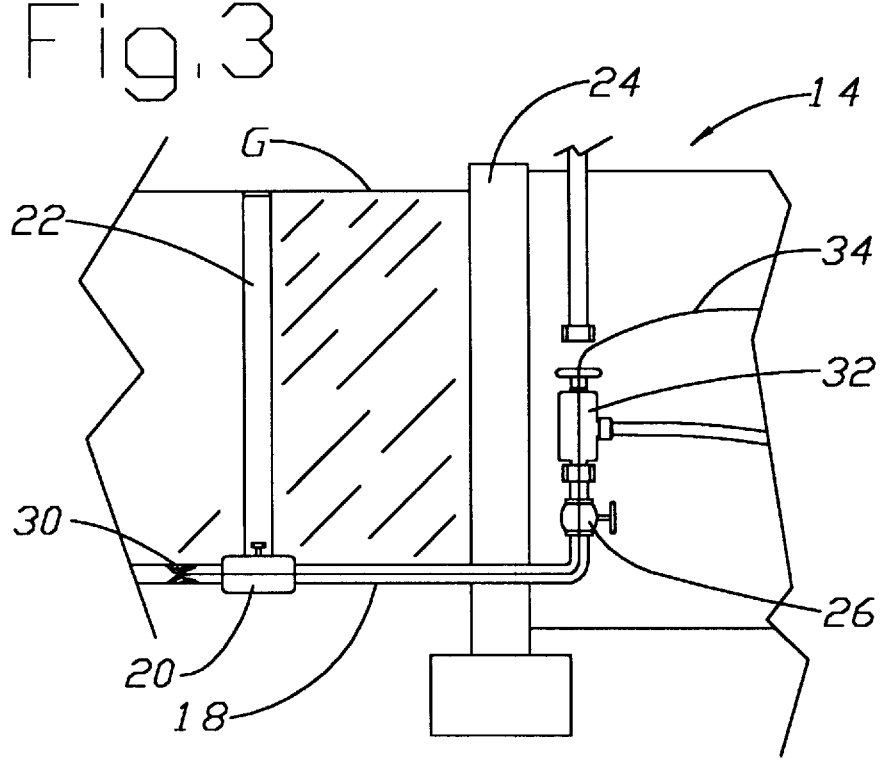
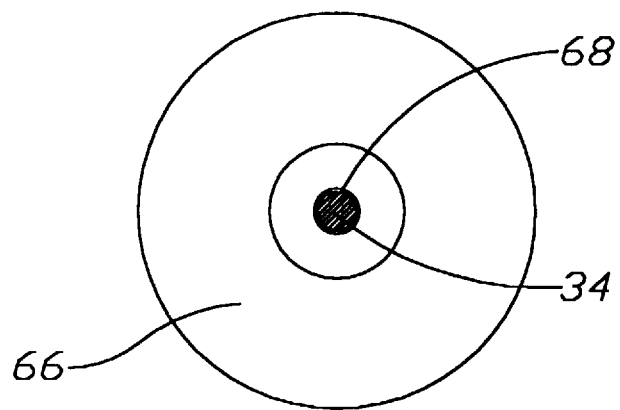

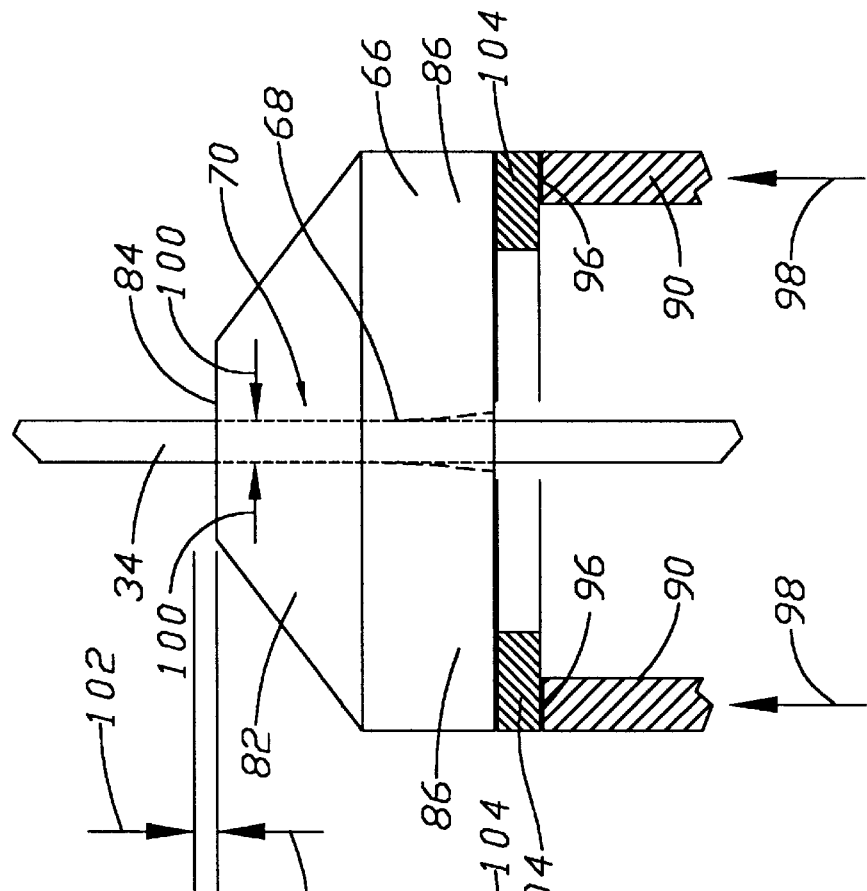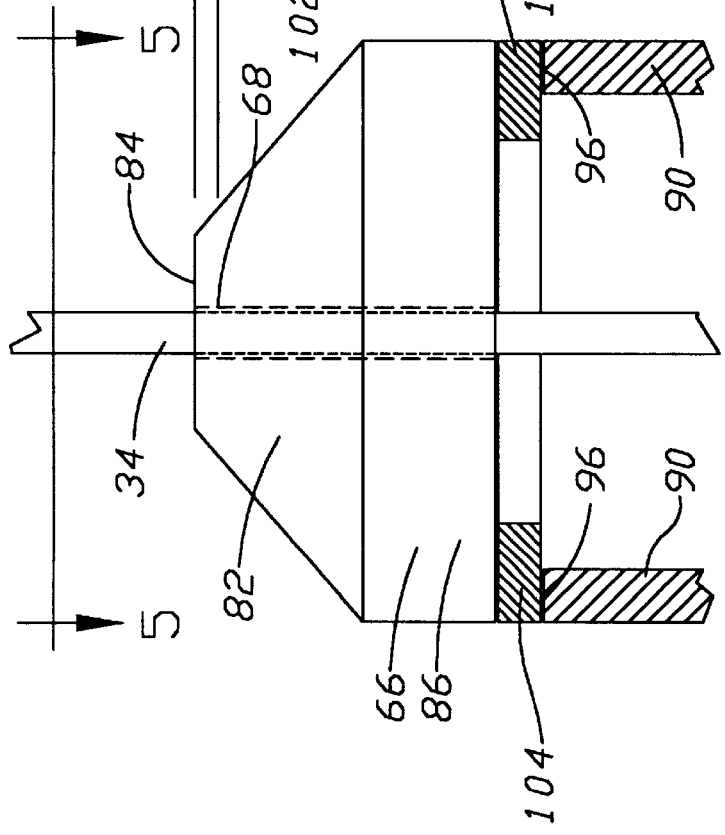

WATER SERVICE LINE CLEANING DEVICE AND METHOD

BACKGROUND OF THE INVENTION

1. Field of the Invention

The present invention relates to an apparatus and method for removing obstructions within a service line for carrying a pressurized fluid and more particularly, an apparatus and method for removing obstructions from a service line carrying pressurized water into a building.

2. Description of the Related Art Including Information Disclosed Under 37 CFR 1.97–1.99

It is known that numerous devices have been employed to clear obstructions from a fluid service pipeline, however, some of these devices do not clear the service pipeline while the line contains the pressurized fluid such as water. Such a device is seen in U.S. Pat. No. 1,328,726 issued Jan. 1, 1920 to Dezendorf, which does not utilize the pressurized fluid or water normally carried by the service pipeline to extricate the obstruction from the service pipeline but rather needs to independently provide such pressurized fluid to extricate the obstruction.

Other devices such as in U.S. Pat. Nos. 1,238,269 issued Aug. 28, 1917 to Cornwell and 2,147,593 issued Feb. 14, 1939 to Bracken provide plunger elements sealed within the pressurized fluid. These devices utilize either the pressurized water normally contained in such pipeline or provide additional water if needed, as in Bracken, when there is a deficiency of water in the pipeline. The plunger is submerged within the water which is in communication with the service line and upon impact of force to the external portion of the plunger, the plunger, in turn, imparts a force to the pressurized fluid within the pipeline in the attempt to dislodge obstructions.

Other devices such as in U.S. Pat. No. 1,553,034 to Donnelly utilize a rigid push rod contained slidably within a bore of a barrel member with a working lead head that upon striking the opposing striking end of the push rod the working lead head enters a valve within a pipeline to clean out obstructions. The unit is sealed utilizing opposing annular flanges positioned around the barrel and a gasket positioned between the opposing flanges that also surrounds the barrel thereby keeping the barrel water sealed. The obstruction can be dislodged with striking the push rod with no reduction in the pressure of the water main required.

Other devices that have been used to remove obstructions within water pipelines as shown in U.S. Pat. No. 2,259,644 issued Oct. 21, 1941 to Kling. In this device a pump is interposed between a hot and cold water tap. Hot water is run through cold water pipelines utilizing the temperature differential to loosen scale and is drained out of the line. The process is reversed with placing cold water within the hot water pipeline to similarly remove undesired scale.

Other methods of removing an obstruction within a water service pipeline include shutting off the water supply at the municipal shut off valve. With the water supply shut off at the municipal shut off, the service pipeline could be rodded from the municipal shut off location to the building or in reverse from the building to the municipal shut off. This method has its limitations in that the obstruction may be located beyond the municipal shut off, between the municipal shut off and the main. This method would not remove this obstruction. Moreover, the municipal shut off is located outside and could easily be frozen and difficult to move to shut off or on.

Should an attempt to rod from the municipal shut off to the main be attempted, the municipal shut off is usually located at some depth below grade and difficult to access for this purpose and if accessible would be quite a wet operation. To rod the service line to the main without there being an unusually large amount of water expelled from the service pipeline the corporation stop at the main would need to be shut off to cut off the water supply from the main to the service pipeline. This corporation stop is located below grade and would require excavation to access it.

SUMMARY OF THE INVENTION

It is therefore the object of this invention to provide an apparatus for removing an obstruction within a pressurized fluid service pipeline which includes a flexible rod and a module for connecting to the service pipeline in which the module defines a channel and a first opening in which the first opening communicates with and between the service pipeline and the channel and permits the channel to receive the pressurized fluid from the pipeline. The module defines a second opening which communicates with and between the channel and with an outside of the module and a flexible seal in which the seal defines an opening and in which the seal is positioned to abut the module and align the opening of the seal with the second opening for receiving the insertion of the flexible rod through the opening of the seal to engage the obstruction in the pipeline. At least a portion of the flexible seal engages the flexible rod inhibiting the pressurized fluid in the channel from moving along the flexible rod to the outside of the module. At least a portion of the flexible seal is flexed against the flexible rod further inhibiting the pressurized fluid from passing from the channel along the flexible rod to the outside of the module.

Another object of the present invention includes a method for removing an obstruction from a service pipeline containing pressurized fluid which includes the steps of securing a module to the pipeline. The module defines a first opening for communicating with and between the pipeline and a channel defined within the module for receiving the pressurized fluid from the pipeline. The module defines a second opening communicating with and between the channel to an outside of the module. The method includes the step of inserting a flexible rod into the second opening, with a flexible seal engaging the flexible rod at the second opening inhibiting the pressurized fluid moving from the channel out of the second opening, and through the channel and the first opening into the pipeline until it reaches a location of the obstruction. In addition the step includes flexing at least a portion of the seal against the flexible rod further inhibiting the passing of the pressurized water from the channel along the flexible rod and to the outside of the module requiring additional force to move the flexible rod in the process of dislodging the obstruction.

BRIEF DESCRIPTION OF THE DRAWING

The foregoing objects and advantageous features of the invention will be explained in greater detail and others will be made apparent from the detailed description of the preferred embodiment of the present invention which is given reference to the several figures of the drawing, in which:

FIG. 1 is a cross section view of a water main and a perspective view of the water service pipeline accessing the interior of a house with the water measuring meter connected thereto;

FIG. 2 is a partial view of FIG. 1 with the water measuring meter removed and the present invention secured to the service pipeline installed in place of the water measuring meter within the interior of the house;

FIG. 3 is the view in FIG. 2 with the flexible rod of the present invention inserted into the water service pipeline engaging an obstruction;

FIG. 5 is an enlarged top view of the flexible seal member as seen along line 5—5 in FIG. 6A;

FIG. 6A is an enlarged perspective view of the flexible seal engaging the flexible rod and a partial cross section view of the leading end of the cylindrical portion of the turning handle member; and FIG. 6B is the view of FIG. 6A in which the leading end of the cylindrical portion of the turning handle member exerts a force compressing the flexible seal against the flexible rod.

DETAILED DESCRIPTION

Figure 4:
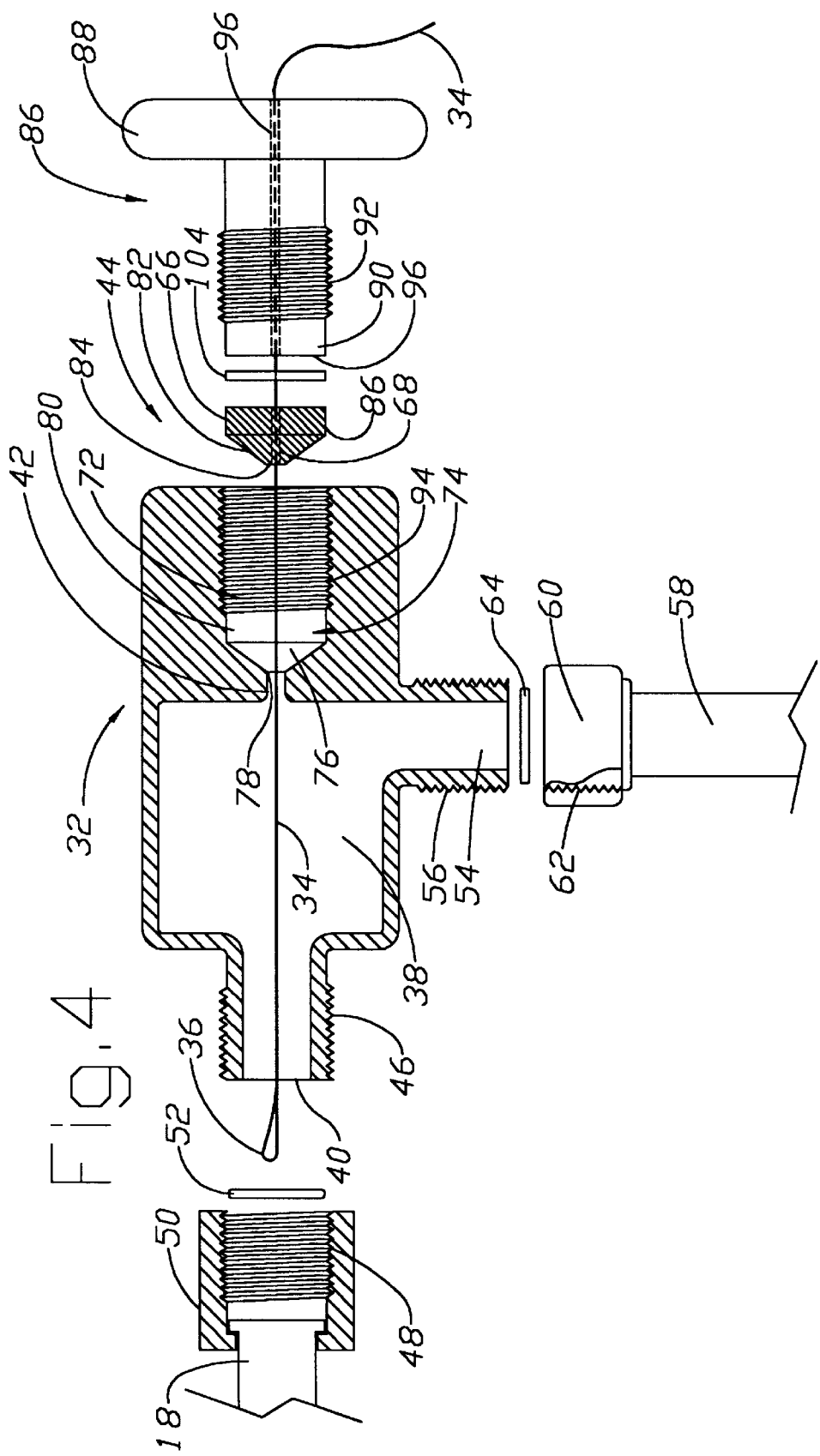
FIG. 4 is an exploded partial cross section view of the present invention.

The present invention is utilized to clear obstructions in service supply pipelines carrying pressurized fluid. A typical example of such service supply pipeline is a water service supply pipeline for residences and other buildings discussed below.

Referring now to the drawing in FIG. 1 which shows such a typical water service pipeline supply structure. Water main 10 is positioned below ground grade G. Main 10 is tapped at 12 for a building 14 in which a corporation shut off valve 16 is positioned at the location of tap 12. Service pipeline 18 carries water from main 10.

Typically, pipeline 18 is maintained at a distance below ground grade G to be out of the frost line for that region. Pipeline 18 progresses toward building 14 to a municipal shut off valve 20 which is positioned below ground grade G at the bottom of the municipal shut off shaft 22.

Pipeline 18 progresses from municipal shut off valve 20 to building 14 through a foundation wall 24 to an interior portion of building 14. Shut off valve 26 positioned upstream from fluid measuring meter or water meter 28 are typically located within the interior of building 14 and easily accessed therefrom. Over time, sediment, scale or rust can accumulate in a water supply pipeline 18 and create an obstruction 30, as seen in FIG. 3.

As seen in FIG. 2, water measuring meter 28 is removed from service pipeline 18 after shut off valve 26 has shut off the water supply. The present invention which includes module 32 is installed to pipeline 18 and flexible rod 34 is inserted into module 32 to eventually position flexible rod 34 at obstruction 30 to break up the same, as shown in FIG. 3.

The present invention includes flexible rod 34 as set forth above. Rod 34 will typically be constructed of wire or other suitable material which will bend yet maintain strength in order to exert a force in breaking up obstruction 30. An electrician's fish tape has this type of flexibility and strength. Rod 34 has lead end 36, as seen in FIG. 4, which has a dimension transverse to the elongated direction of rod 34 that is greater than the dimension of rod 34 in the same transverse direction. This larger lead end 36 provides a working end that makes it easier for the user to impact obstruction 30 without missing the undesired material. Moreover, the user can remove more of the undesired material with less maneuvering of rod 34.

Module 32 is connected to pipeline 18 downstream of obstruction 30. Module 32 ideally can be connected to pipeline 18, as in the present example, in a convenient location such as within building 14 in order to clear obstruction 30 in pipeline 18 in a portion of pipeline 18 that is not convenient to reach such as below ground grade G. With module 32 positioned downstream of obstruction 30 the pressurized water in pipeline 18 will assist in moving the material of the obstruction to module 32 for removal from pipeline 18 as discussed below.

It is preferable that module 32 is connected to pipeline 18 downstream from shut off valve 26, as seen in FIGS. 1–3, of pipeline 18. Being downstream from shut off valve 26, allows the user to shut off the flow of pressurized water in pipeline 18 prior to removal of water meter 28 and prior to the complete installation of module 32 thereby reducing the wetness of the operation.

Module 32 connects to service pipeline 18. Module 32 defines channel 38 and first opening 40 in which first opening 40 communicates with and between service pipeline 18 and channel 38 and permits channel 38 to receive pressurized fluid from pipeline 18. Module 32 defines second opening 42 which communicates with and between channel 38 and with outside 44 of module 32.

First and second openings 40 and 42 of module 32 are disposed on opposing sides of channel 38 and substantially aligned with one another. This configuration makes it easier for the user to push rod 34 through second opening 42 through channel 38 to engage first opening 40.

Module 32 is releasably connected to pipeline 18 in order to use when obstruction 30 is needed to be removed. Module 32 defines set of threads 46, as shown in FIG. 4, which are disposed about first opening 40 for engaging compatibly engaging set of threads 48 defined within coupling or hex nut 50 which is secured to pipeline 18. Washer 52 is preferably, a conventional washer made of elastomeric material or the like and is disposed between and abuts pipeline 18 and housing of module 32 which surrounds first opening 40 within coupling 50 to block leakage of pressurized water.

Module 32 defines third opening 54 which communicates with and between channel 38 and with outside 44 of module 32 for permitting pressurized fluid or water received by channel 38 to move out of channel 38 permitting dislodged obstructions to be carried out of channel 38 of module 32 by the pressurized fluid or water. Module 32 defines set of threads 56 about third opening 54 in which hose 58 having another coupling 60 which has set of threads 62 compatibly engageable to threads 56 of third opening 54 for securing hose 58 into communication with channel 38 of module 32. Another washer 64 is positioned within coupling 60 between third opening 54 and hose 58.

The present invention includes flexible seal 66, as seen in FIGS. 4, 5, 6A and 6B. Seal 66 defines opening 68 and in which seal 66 is positioned to abut module 32 and align opening 68 of seal 66 with second opening 42 for receiving the insertion of flexible rod 34 through opening 68 of seal 66 to engage obstruction 30, as shown in FIG. 3, in pipeline 18. Flexible rod 34 is inserted into flexible seal 66 through opening 68 which provides a relatively close fit to flexible rod 34 in which at least a portion of flexible seal 66 engages flexible rod 34 which inhibits flow of pressurized fluid or water of channel 38 from passing along rod 34 to outside of module 44. This fit of flexible rod 34 with seal 66 allows the user to insert flexible rod 34 and to be moved to the desired location of obstruction 30 with the minimal expelling of water from pipeline 18. Once flexible rod has reached obstruction 30, the user, as discussed below, will flex at least a portion 70 of flexible seal 66 against flexible rod 34 further inhibiting pressurized fluid or water from passing from channel 38 along flexible rod 34 to outside 44 of the module 32. This flexing of seal 66 against rod 34 tightens the engagement between seal 66 and rod 34 permitting the user to apply forceful movements to rod 34 to attempt to break away obstruction 30 from sidewalls of pipeline 18 but will further inhibit the escape of water from pipeline 18 to outside 44. Seal 66 will be unflexed by the user when the user removes rod 34 from pipeline 18 an module 32.

For this flexing and unflexing of seal 66, this particular embodiment has module 32 defining recess 72, as shown in FIG. 4, on an external portion of module 32 in which recess 72 is in communication with second opening 42. Recess 72 defines seat 74 adjacent second opening 42 for receiving flexible seal member 66.

Seat 74 has a shape substantially the same shape in complementary relationship of at least a portion of flexible seal member 66. Shape of seat 74 is a truncated cone 76 with truncated portion 78 aligned with second opening 42 and cylindrical shape 80 extending from truncated cone 76 in a direction away from second opening 42, as shown in FIG. 4. Shape of flexible seal 66, as shown in FIGS. 4, 5, 6A and 6B, is a truncated cone 82 in which opening 68 of seal 66 is positioned at truncated portion 84 and passes through the length of seal 66 for aligning with second opening 42. With seal 66 positioned within seat 74, a cylinder portion 86 extends from truncated cone 82 of flexible seal 66 in a direction away from second opening 42.

Turning handle member 86 having a hand grasping portion 88 and a cylindrical portion 90 extending therefrom for inserting into recess 72 in which threads 92 are defined on cylindrical portion 92 for compatibly engaging threads 94 defined by recess 72.

Cylindrical portion 90 of turning handle member 86 has hollow opening 96 through and along the length of cylindrical portion 90 which aligns with opening 68 defined by seal 66 and second opening 42 with threads 94,92 of recess 72 and cylindrical portion 90 compatibly engaged for receiving flexible rod 34 for insertion through second opening 42.

Leading end 96 of cylindrical portion 90 engages cylinder portion 86 of seal 66 exerting a force, as shown by arrows 98 in FIG. 6B, onto truncated cone portion 82 of flexible seal 66 pushing flexible seal 66 against seat 74 flexing at least a portion of truncated cone portion 82 against flexible rod 34 having a resulting force indicated by arrows 100. At least a portion of flexible seal 66 is compressed in FIG. 6B as demonstrated by arrows 102. Washer 104 is positioned between cylinder portion 86 of seal 66 and cylindrical portion 90 of turning handle 86.

The present invention includes a method for removing obstruction 30 from service pipeline 18 containing pressurized fluid such as water. The method includes securing module 32 to service pipeline 18 in which module 32 defines first opening 40 for communicating with and between pipeline 18 and channel 38 defined within module 32 for receiving pressurized fluid such as water from pipeline 18. Module 32 defines second opening 42 communicating with and between channel 38 to outside 44 of module 32.

The method includes the step of inserting flexible rod 34 into second opening 42, with flexible seal 66 engaging flexible rod 34 at second opening 42. Seal 66 engages flexible rod 34 with typically abutting rod 34, as seen in FIG. 6A, which inhibits pressurized fluid moving from channel 38 out of second opening 42 to outside 44. The insertion of rod 34 continues through channel 38 and first opening 40 into pipeline 18 until it reaches a location of obstruction 30.

The method further includes flexing at least a portion of seal 66 against flexible rod 34 which compresses seal 66 as seen FIGS. 6A and 6B at 102 providing a resulting force indicated by arrows 100 onto at least a portion of seal 66 further inhibiting the passing of said pressurized water from channel 38 along flexible rod 34 and to outside 44 of module 32. As a result, additional force is required to move flexible rod 34 in the process of dislodging obstruction 30.

The method includes the step of connecting hose 58 to third opening 54 defined by module 32 in which third opening 54 communicates with and between channel 38 and outside 44 of module 32 for diverting pressurized fluid from channel 38 to outside 44 of module 32 and facilitating carrying away pressurized fluid or water and any broken away obstruction 30 carried by pressurized fluid.

The method also includes the step of positioning an exit portion of hose 58 at a desired location for depositing pressurized fluid.

The method further includes the step of removing fluid measuring meter or water meter 28 from service pipeline 18 before securing module 32 to service pipeline 18 at a location in which fluid measuring meter 28 occupied before removal, as seen in FIGS. 1 and 2.

The method additionally includes the step of closing shut off valve 26 on pipeline 18 upstream from fluid measuring meter 28 prior to removing fluid measuring meter 28 from service pipeline 18.

The method includes the step of opening shut off valve 26 upstream from module 32 with module 32 secured to pipeline 18. It also includes the step of closing shut off valve 26 upstream from module 32 prior to removing module 32. Once module 32 has been removed from pipeline 18 the method includes the step of installing fluid measuring meter or water meter 28 to service pipeline 18 in place of module 32 which has been removed from service pipeline 18 and the step of opening shut off valve 26 after installation of fluid measuring meter 28 is complete.

The step of inserting flexible rod 34 includes moving flexible rod 34 to impact obstruction 30 thereby impacting leading end 36 of rod 34 onto obstruction 30 to dislodge obstruction 30 from securement to a wall of pipeline 18. Dislodged obstruction 30 will be removed from pipeline 18 with the moving of pressurized fluid out of pipeline 18 to hose 58.

The user would desire to take the step of unflexing at least a portion of flexible seal 66 from flexible rod 34 for removing flexible rod 34 from pipeline 18. Removal of force indicated by arrows 98 by loosening handle 88, in turn, removes resulting force indicated by arrows 100, as shown in FIG. 6B, permitting rod 34 to move more easily through opening 68 of seal 66.

While a detailed description of the preferred embodiment of the invention has been given, is should be appreciated that many variations can be made thereto without departing from the scope of the invention as set forth in the appended claims.

I claim:

1. An apparatus for removing an obstruction within a pressurized fluid service pipeline, comprising:

a flexible rod;

a module for connecting to said service pipeline in which the module defines a channel and a first opening in which the first opening communicates with and between the service pipeline and the channel and permits said channel to receive said pressurized fluid from said pipeline in which said module defines a second opening which communicates with and between the channel and with an outside of said module;

a flexible seal having an opening and in which said seal abuts said module such that the opening of said seal is aligned with said second opening of the module for receipt of said flexible rod inserted through said opening of said seal to engage said obstruction in said pipeline, said flexible seal engages said flexible rod inserted through the opening of said seal to inhibit said pressurized fluid in said channel from moving along said flexible rod to said outside of said module; and means for compressing at least a portion of said flexible seal to flex against said flexible rod inserted through the opening of the seal further inhibiting said pressurized fluid from passing from said channel along the flexible rod to the outside of the module.

2. The apparatus of claim 1 in which said flexible rod includes a lead end having a dimension transverse to an elongated direction of said rod that is greater than the dimension of said rod in the same said transverse direction.

3. The apparatus of claim 1 in which said first and second openings of said module are disposed on opposing sides of said channel and are aligned with one another.

4. The apparatus of claim 1 in which said module is connected to said pipeline down stream of said obstruction.

5. The apparatus of claim 1 in which said module is connected to said pipeline down stream from a shut off valve of said pipeline.

6. The apparatus of claim 1 in which said module is releasably connected to said pipeline.

7. The apparatus of claim 6 in which said module defines a set of threads about said first opening for engaging a compatibly engaging set of threads defined within a coupling which is secured to said pipeline.

8. The apparatus of claim 7 in which a washer is disposed between said pipeline and said first opening within said coupling.

9. The apparatus of claim 1 in which said module defines a third opening which communicates with and between said channel and with said outside of said module for permitting said pressurized fluid received by said channel to move out of said channel permitting dislodged obstructions to be carried out of said channel of said module by said pressurized fluid.

10. The apparatus of claim 9 in which said module defines a set of threads about said third opening.

11. The apparatus of claim 10 including a hose having another coupling in which the other coupling has a set of threads compatibly engageable to said threads of said third opening for securing said hose into communication with said channel of said module.

12. The apparatus of claim 11 in which another washer is positioned within said coupling between said third opening and said hose.

13. The apparatus of claim 1 in which said module defines a recess on an external portion of said module in which the recess is in communication with said second opening.

14. The apparatus of claim 13 in which said recess defines a seat adjacent said second opening for receiving said flexible seal member.

15. The apparatus of claim 14 in which said seat has a shape which is in complementary relationship to the shape of at least a portion of said flexible seal member.

16. The apparatus of claim 15 in which said shape of said seat is a truncated cone having a truncated portion aligned with said second opening and a cylindrical shape of the recess extending from said cone in a direction away from said second opening and in which the shape of said flexible seal is another truncated cone in complementary relationship to the truncated cone shape of said seat in which the opening of said seal is positioned at a portion of the other truncated cone for aligning with said second opening with said seal positioned within said seat and a cylinder portion of the seal extending from the other truncated cone of said flexible seal in a direction away from said second opening.

17. The apparatus of claim 16 in which the compressing means includes a turning handle member having a hand grasping portion and a cylindrical portion extending therefrom for inserting into said recess in which threads are defined on said cylindrical portion for compatibly engaging threads defined by said recess.

18. The apparatus of claim 17 in which said cylindrical portion of said turning handle has a hollow opening through and along the length of said cylindrical portion, which aligns with said opening defined by said seal and said second opening with said threads of said recess and cylindrical portion compatibly engaged, for receiving said flexible rod for insertion through said second opening.

19. The apparatus of claim 17 in which a leading end of said cylindrical portion engages said cylinder portion of said seal exerting a force onto said truncated cone portion of said flexible seal pushing said flexible seal against said seat flexing at least a portion of said truncated cone portion against said flexible rod.

20. The apparatus of claim 19 includes positioning a washer between said cylinder portion of said seal and said cylindrical portion of said turning handle.

21. The apparatus of claim 1 in which said service pipeline is a water service pipeline for servicing a building with a water supply.

22. The apparatus of claim 21 in which said module replaces a disconnected water meter from said water service pipeline.

23. The apparatus of claim 1 in which said at least portion of said flexible seal is flexed against said flexible rod with said flexible rod engaged with said obstruction.

24. A method for removing an obstruction from a service pipeline containing pressurized fluid, including the steps of:

securing a module to said service pipeline in which said module defines a first opening for communicating with and between said pipeline and a channel defined within said module for receiving said pressurized fluid from said pipeline, in which said module defines a second opening communicating with and between said channel to an outside of said module;

inserting a flexible rod into said second opening, with a flexible seal engaging said flexible rod at said second opening inhibiting said pressurized fluid moving from said channel out of said second opening, and through said channel and said first opening into said pipeline until it reaches a location of said obstruction; and compressing at least a portion of said seal to flex against said flexible rod further inhibiting the passing of said pressurized water from said channel along said flexible rod and to said outside of said module.

25. The method of claim 24 which includes the step of connecting a hose to a third opening defined by said module in which said third opening communicates with and between said channel containing said pressurized fluid and an outside of said module for diverting said pressurized fluid from said channel to outside of said module and facilitating carrying away said pressurized fluid and any broken away obstruction carried by said pressurized fluid.

26. The method of claim 25 which includes positioning an exit portion of said hose at a desired location for depositing said pressurized fluid.

27. The method of claim 24 which includes the step of removing a fluid measuring meter from said service pipeline before securing said module to said service pipeline at a location in which the fluid measuring meter occupied before removal.

28. The method of claim 27 which includes the step of closing a shut off valve on said pipeline upstream from said fluid measuring meter prior to removing said fluid measuring meter from said service pipeline.

29. The method of claim 27 said fluid measuring meter includes a water measuring meter for measuring volumes of water entering a building from a water service pipeline.

30. The method of claim 24 which includes the step of opening a shut off valve upstream from said module with said module secured to said pipeline.

31. The method of claim 24 includes the step of closing a shut off valve upstream from said module prior to removing said module.

32. The method of claim 31 includes the step of installing a fluid measuring meter to said service pipeline in place of said module which has been removed from said service pipeline and the step of opening said shut off valve after said installation of said fluid measuring meter.

33. The method of claim 24 in which the step of inserting said flexible rod includes moving said flexible rod to impact said obstruction to dislodge the obstruction from securement to a wall of said pipeline.

34. The method of claim 24 includes the step of unflexing said at least a portion of said flexible seal from said flexible rod for removing said flexible rod from said pipeline.

* * * * *